(12) United States Patent
Giovanardi

(10) Patent No.: US 6,848,570 B2
(45) Date of Patent: Feb. 1, 2005

(54) UNLOADING END FRAME OF A DIE-LOADING BELT CONVEYOR OF CERAMIC MATERIALS

(75) Inventor: Umberto Giovanardi, Castellarano (IT)

(73) Assignee: R.P. S.r.l., Roteglia (IT)

( * ) Notice: Subject to any disclaimer, the term of this patent is extended or adjusted under 35 U.S.C. 154(b) by 0 days.

(21) Appl. No.: 10/480,051

(22) PCT Filed: Jul. 15, 2002

(86) PCT No.: PCT/IT02/00462

§ 371 (c)(1),
(2), (4) Date: Dec. 9, 2003

(87) PCT Pub. No.: WO03/018444

PCT Pub. Date: Mar. 6, 2003

(65) Prior Publication Data

US 2004/0149547 A1 Aug. 5, 2004

(30) Foreign Application Priority Data

Aug. 28, 2001 (IT) .................... MO2001A0175

(51) Int. Cl.⁷ ............................................ B65G 15/08
(52) U.S. Cl. ...................................... 198/816; 198/812
(58) Field of Search ................................ 198/816, 812, 198/813, 782

(56) References Cited

U.S. PATENT DOCUMENTS

| | | | | |
|---|---|---|---|---|
| 2,179,187 A | * | 11/1939 | Kendall | 198/830 |
| 2,897,955 A | * | 8/1959 | Morrow | 198/830 |
| 2,909,274 A | * | 10/1959 | Koeske | 198/728 |
| 2,939,571 A | * | 6/1960 | Evans | 198/816 |
| 3,118,315 A | * | 1/1964 | Loosli | 198/816 |
| 3,259,227 A | | 7/1966 | Steinmetz | |
| 3,294,218 A | | 12/1966 | Chantland | |
| 4,431,104 A | * | 2/1984 | Orlowski et al. | 198/427 |
| 4,881,633 A | * | 11/1989 | Cailey et al. | 198/345.1 |
| 5,054,608 A | * | 10/1991 | Bryant | 198/816 |
| 5,096,045 A | * | 3/1992 | Feldl | 198/583 |
| 5,389,045 A | * | 2/1995 | Lyons | 474/113 |
| 5,609,238 A | * | 3/1997 | Christensen | 198/583 |
| 6,267,228 B1 | * | 7/2001 | Cadwell et al. | 198/806 |
| 6,298,981 B1 | * | 10/2001 | Hosch et al. | 198/813 |
| 6,685,009 B1 | * | 2/2004 | Hosch et al. | 198/813 |

FOREIGN PATENT DOCUMENTS

| | | |
|---|---|---|
| EP | 0 492 733 | 7/1992 |
| EP | 0 822 044 | 2/1998 |
| EP | 1 175 985 | 1/2002 |
| GB | 1 494 960 | 12/1977 |
| GB | 2 109 327 | 6/1983 |

OTHER PUBLICATIONS

Patent Abstract of Japan, vol. 2000, No. 13, Feb. 5, 2001 abstract & JP 2000 302220 A (Ishikawajima Heavy IND CO LTD) Oct. 31, 2000.

* cited by examiner

Primary Examiner—Douglas Hess
(74) Attorney, Agent, or Firm—Young & Thompson

(57) ABSTRACT

An unloading end frame of a die-loading belt conveyor includes elements about which the belt winds at least partially during motion thereof. The elements comprise a plurality of small-diameter rollers (3) arranged consecutively to one another, each of which is supported at ends thereof by support elements (4). The small-diameter rollers (3) are arranged consecutively to one another is such a way that axes thereof form a broken line.

5 Claims, 2 Drawing Sheets

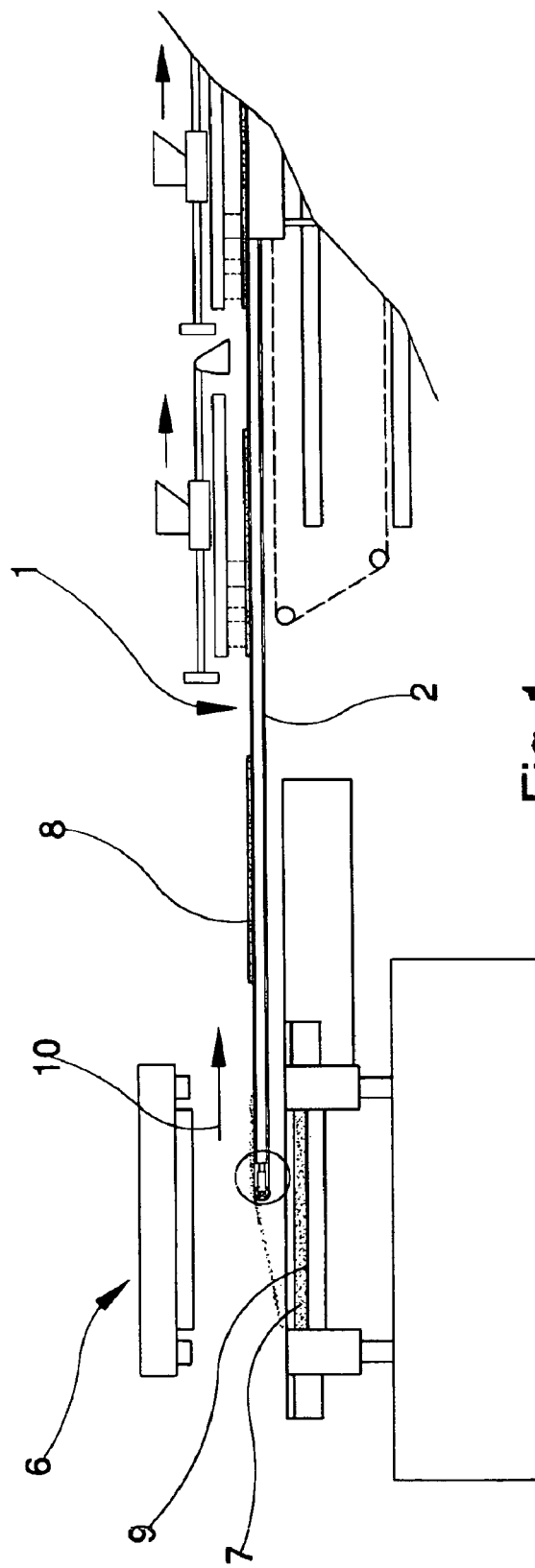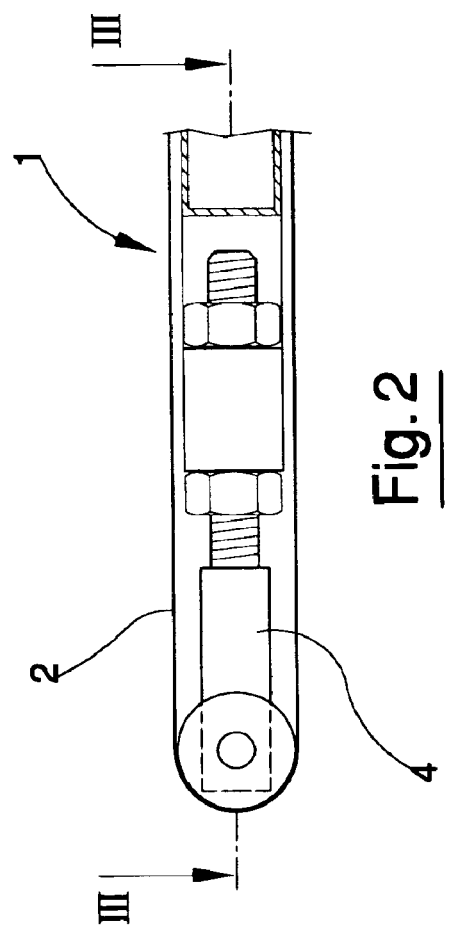

UNLOADING END FRAME OF A DIE-LOADING BELT CONVEYOR OF CERAMIC MATERIALS

TECHNICAL FIELD

The invention relates to an unloading end frame of a belt conveyor carrying ceramic materials.

BACKGROUND ART

Specifically, though not exclusively, the invention is applied in loading dies for for the formation of ceramic tiles in devices generally known as double-loading devices, usually structured so as to deposit internally of a forming cell of a die a layer of powder material, which is usually laid on top of an already-deposited layer of powder material.

These devices operate in combination with usual means for loading (drawers or trucks) a press, using various devices among which conveyor belts exhibiting an unloading frame which moves alternatingly horizontally above the cell in synchrony with the other means for loading.

The operation of these devices is proportionally better in relation to the overall width of the unloading frame (and therefore the belt conveyor), and also in relation to the rigidity and geometrical stability of the structure and the geometrical configuration of the unloading frame.

U.S. Pat. No. 3,294,218 discloses a carrier for supporting a portion of a belt comprising first roller means for supporting the midsection of said belt and second roller means for supporting the side sections of said belt. Each of second roller means have shaft means which have inner ends pivotally mounted on a support fixed to the frame of the carrier and outer ends supported by means that adjustably secure said outer ends to respective upright posts fixed to the frame of the carrier for varying the angular position of the second roller means relative to the first roller means to change the cross sectional concave contour of the belt.

U.S. Pat. No. 3,259,227 discloses an idler assembly having an idler roll disposed on an inclined axis, a bracket for supporting one end of the idler roll, pivot means for pivotally mounting said bracket to permit the inclination of said idler roll axis to be varied, a second bracket like the first bracket for supporting the other end of the idler roll, and means adjustable upwardly and downwardly and pivotally connected to said second bracket to selectively adjust the position of said other end of th idler roil to thereby selectively set the inclination of the axis of said idler roll.

GB 1,494,960 discloses an adjustable support mechanism for conveyor mechanism including an endless load-carrying belt, the support mechanism providing inclined surfaces for supporting marginal edge portions of the load-carrying belt to cause the belt to trough and comprising a pair of support assemblies disposed in use one on each side of the conveyor, each support assembly including at least a pair of support brackets which are to be spaced apart longitudinally of the belt and capable of being secured adjustably to respective mounting brackets, each support assembly including also a carrier assembly and a plurality of rollers, each carrier assembly being pivotally adjustable on the support brackets, screwthreaded adjustment means being provided for adjusting the inclination of each carrier assembly on said support brackets for varying the degree of troughing of the belt.

The prior art all presents drawbacks with regard to the above qualities. For example, the width of the unloading frame is very limited. A further problem in the prior art is that it is difficult to maintain the right perfectly-centered and guided tension on the belt during movement above the underlying cell. This difficulty is manifested in the use of wide belts (2–3 meters and more) whose use is made practically impossible in known applications.

The main aim of the present invention is to obviate these limitations and drawbacks in the prior art.

An advantage of the invention is its simplicity.

A further advantage consists in its modular structure.

These aims and advantages and more besides are fully achieved by the present invention as it is characterised in the claims that follow.

DISCLOSURE OF INVENTION

Further characteristics and advantages of the present invention will better emerge from the detailed description that follows of a preferred but non-exclusive embodiment of the invention, illustrated purely by way of a non-limiting example in the accompanying figures of the drawings, in which:

FIG. 1 is a schematic lateral view in vertical elevation of the invention in an intermediate operative configuration during a work cycle;

FIG. 2 is an enlarged-scale view of a detail of FIG. 1;

Figure 3:
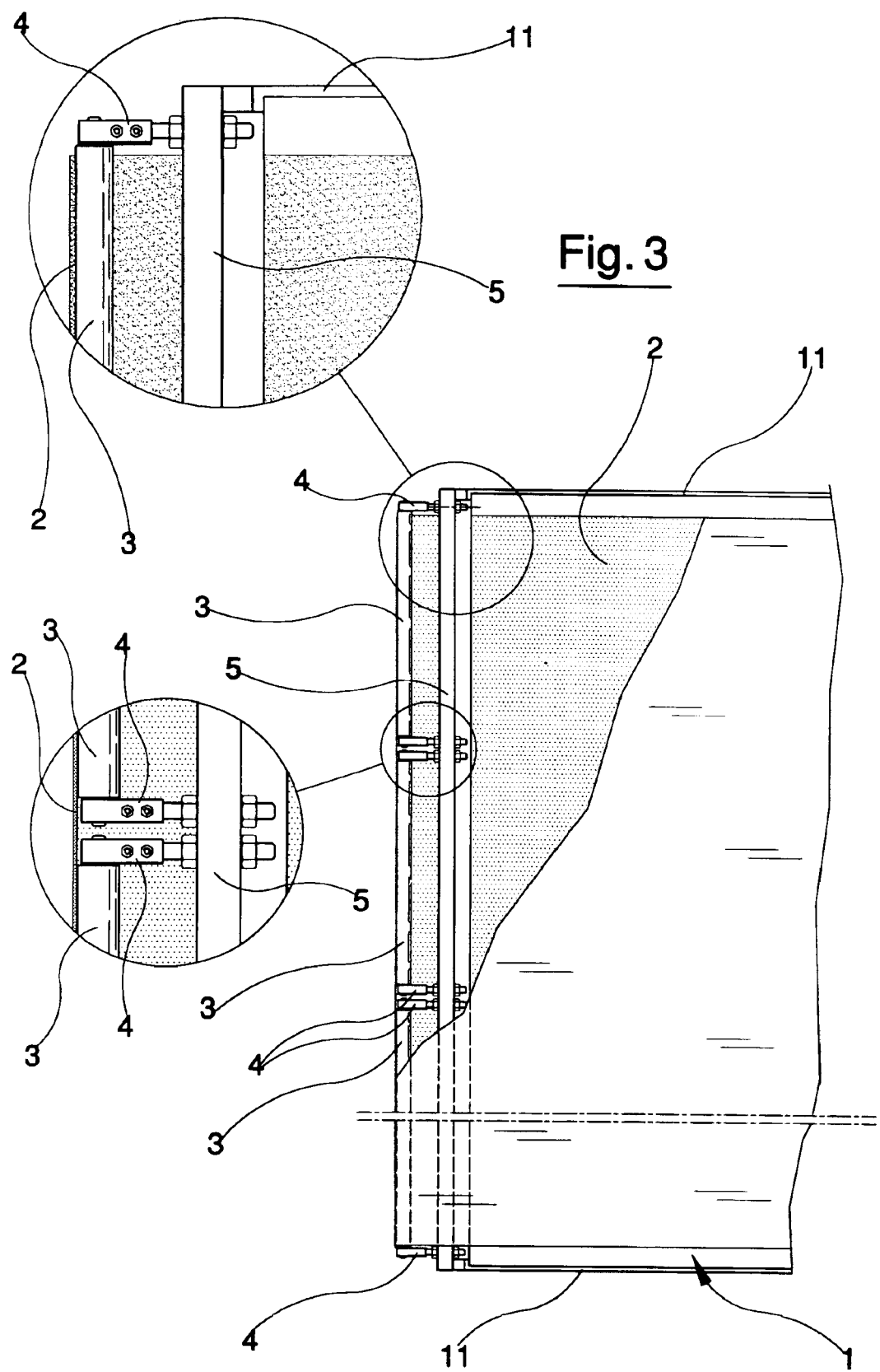
FIG. 3 is part of a section made according to line III—III of FIG. 2.

With reference to the figures of the drawings, 1 denotes in its entirety a belt conveyor whose unloading frame is part of a device often termed a double-loading device, which is associated to a die for forming ceramic tiles and which is structured to deposit a layer of powder material 8 inside a forming cell; generally on top of a lower layer of powders 7 previously laid by a usual loading drawer or truck.

The layer of powder material 8 is normally prepared on the "upstream" part of the upper branch of the belt 2, not shown in the figures.

The unloading frame of the belt conveyor 1 is made to alternate above the cell 9 of the die 6, in the direction indicated by the arrow 10, in synchrony with the movements of the other loading means which load the lower layer of powders 7, not shown in the figures.

The unloading frame comprises a bearing structure which includes a transversal bar 5 fixed to the ends of horizontal rods 11.

The bar 5 supports a plurality of small-diameter rollers 3 arranged consecutively on which the belt 2 at least partially winds.

Each of the rollers 3 is supported and constrained to the ends of support elements 4 which are mounted on the bar 5.

In particular, the small-diameter rollers 3 are arranged consecutively one after another in such a way that the axes thereof form a broken line.

The support elements 4 are mounted on the bar 5 by screw-connections which can be adjusted so that the distance of the ends of the single rollers 3 (to which the support elements 4 are constrained) from the bar 5 axis can be regulated or calibrated.

The rollers 3, which in a preferred embodiment are identical one to another, constitute a modular structure which in its entirety forms a strong rotating body which is well-supported and on which the belt 2 winds to form the end or frame of the belt conveyor 1.

The rotating means is very rigid independently of its overall length. This rigidity depends on the flexional deformability of the single rollers 3 and the bar 5.

The ability to regulate the distances of the ends of the single rollers 3 (using the support elements 4) with respect to the axis of the bar 5 means the reciprocal arrangement of the rollers 3 can be conformed to shape the belt 2 as required to obtain the desired centring.

The small diameter of the rollers 3 means that almost independently of the width of the end frame (and obviously the belt) the mass of the device can be reduced and therefore the distance of the layer of material to be unloaded, with the result that the dropping distance of the powder materials is reduced and the best dropping distance for the powders can be optimally calculated.

The size of the support elements 4, which is less than the rollers 3 (the size in section is less than the diameter of the rollers 3), and the short distance (10–20 mm) between the single rollers 3 mean that a single belt 2 can be used for even considerable widths (2–3 meters and more). The belt 2 can be wound on rollers 3 over the whole width of the end frame, without interfering with the support elements 4.

What is claimed is:

1. An unloading end frame of a die-loading belt conveyor comprising means about which the belt winds at least partially during motion thereof, the means comprising a plurality of small diameter rollers (3) arranged consecutively to one another, each of which is supported at ends thereof by support elements (4);

the small-diameter rollers (3) being arranged consecutively to one another in such a way that axes thereof form a broken line;

wherein the support elements (4) and a bar (5) on which said support elements are mounted are of a breadth which does not exceed a diameter of the small-diameter rollers (3).

2. The frame of claim 1, wherein the support elements (4) can be regulated.

3. The frame of claim 2, wherein the support elements (4) can be regulated with respect to the bar (5) by means of a screw connection.

4. The frame of claim 1, wherein the small-diameter rollers (3) together make up a modular structure.

5. The frame of claim 2, wherein the small diameter rollers (3) are identical one to another.

\* \* \* \* \*